US009550690B2

(12) United States Patent
Bae et al.

(10) Patent No.: US 9,550,690 B2
(45) Date of Patent: Jan. 24, 2017

(54) METHOD AND APPARATUS FOR REMOVING ORGANIC SUBSTANCES, NITROGEN AND PHOSPHORUS FROM HIGHLY CONCENTRATED ORGANIC WASTE WATER

(71) Applicants: Hee Dong Bae, Gyeonggi-do (KR); SUDOKWON LANDFILL SITE MANAGEMENT CORPORATION, Incheon (KR)

(72) Inventors: Hee Dong Bae, Gyeonggi-do (KR); Jun Ho Cho, Incheon (KR); Ji Taeg Lim, Gyeonggi-do (KR); Jong Choul Won, Gyeonggi-do (KR); Kyung Sam Jung, Incheon (KR); Kang Jin In, Gyeonggi-do (KR); Cheul Hyun Moon, Busan (KR); Kyu Jin Oh, Gyeonggi-do (KR); Byoung Choon Na, Incheon (KR)

(73) Assignees: Hee Dong Bae, Gyeonggi-Do (KR); SUDOKWON LANDFILL SITE MANAGEMENT CORPORATION, Incheon (KR)

( * ) Notice: Subject to any disclaimer, the term of this patent is extended or adjusted under 35 U.S.C. 154(b) by 58 days.

(21) Appl. No.: 14/400,982

(22) PCT Filed: Feb. 6, 2013

(86) PCT No.: PCT/KR2013/000940
§ 371 (c)(1),
(2) Date: Nov. 13, 2014

(87) PCT Pub. No.: WO2013/172540
PCT Pub. Date: Nov. 21, 2013

(65) Prior Publication Data
US 2015/0122729 A1    May 7, 2015

(30) Foreign Application Priority Data
May 17, 2012  (KR) .................. 10-2012-0052723

(51) Int. Cl.
*C02F 9/00* (2006.01)
*C02F 11/02* (2006.01)
(Continued)

(52) U.S. Cl.
CPC . *C02F 9/00* (2013.01); *C02F 1/24* (2013.01); *C02F 1/52* (2013.01); *C02F 1/66* (2013.01);
(Continued)

(58) Field of Classification Search
CPC ................. C02F 9/00; C02F 1/52; C02F 1/66; C02F 11/121; C02F 2101/105; C02F 2101/16; C02F 2101/30; C02F 11/04; C02F 1/24; C02F 11/125; C02F 11/14; C02F 2303/06; C02F 2305/00; C02F 11/123
(Continued)

(56) References Cited

U.S. PATENT DOCUMENTS 3,780,471 A *  12/1973  Ort .......................... A01G 33/00
                                                                 210/170.09
5,514,277 A *   5/1996  Khudenko .............. C02F 3/006
                                                                 210/603
(Continued)

FOREIGN PATENT DOCUMENTS

KR    10-1994-0000379 A    1/1994
KR    10-1996-0014009 A    5/1996
(Continued)

OTHER PUBLICATIONS

Machine-generated English translation of KR 1994-0000379, translated on Mar. 1, 2016.*

*Primary Examiner* — Fred Prince
(74) *Attorney, Agent, or Firm* — Rabin & Berdo, P.C.

(57) ABSTRACT

The present invention relates to a method and apparatus for removing organic substances, nitrogen, and phosphorus from highly concentrated waste water, which includes the steps of: stirring organic waste water; mixing the waste water with an added neutralizer; supplying a flocculant to the mixture to flocculate sludge; and separating sludge and water by pneumatic dehydration, thereby continuously removing organic substances, nitrogen, and phosphorus from waste water.

4 Claims, 2 Drawing Sheets

(51) Int. Cl.
*C02F 11/14* (2006.01)
*C02F 1/52* (2006.01)
*C02F 1/66* (2006.01)
*C02F 11/12* (2006.01)
*C02F 101/10* (2006.01)
*C02F 101/16* (2006.01)
*C02F 101/30* (2006.01)
*C02F 11/04* (2006.01)
*C02F 1/24* (2006.01)

(52) U.S. Cl.
CPC .............. *C02F 11/04* (2013.01); *C02F 11/121* (2013.01); *C02F 11/123* (2013.01); *C02F 11/125* (2013.01); *C02F 11/14* (2013.01); *C02F 2101/105* (2013.01); *C02F 2101/16* (2013.01); *C02F 2101/30* (2013.01); *C02F 2303/06* (2013.01); *C02F 2305/00* (2013.01)

(58) Field of Classification Search
USPC ....... 210/603, 608, 631, 206, 252, 259, 903, 210/906
See application file for complete search history.

(56) References Cited

U.S. PATENT DOCUMENTS

2003/0201225 A1* 10/2003 Josse .................... C02F 1/56
 210/605
2013/0213883 A1* 8/2013 Josse .................... C02F 3/302
 210/630

FOREIGN PATENT DOCUMENTS

| KR | 10-1999-0025207 A | 4/1999 |
| KR | 10-044945 B1 | 9/2004 |
| KR | 10-2011-0088939 A | 8/2011 |

* cited by examiner

METHOD AND APPARATUS FOR REMOVING ORGANIC SUBSTANCES, NITROGEN AND PHOSPHORUS FROM HIGHLY CONCENTRATED ORGANIC WASTE WATER

TECHNICAL FIELD

The present invention relates to a method and apparatus for removing organic substances, nitrogen, and phosphorus from highly concentrated waste water capable of limiting density properly by rapidly removing the contaminants such as organic substances, nitrogen and phosphorus contained in the highly concentrated organic waste waters such as a food waste water or a livestock sludge waste water and so on, and more particularly, to a method and apparatus for removing organic substances, nitrogen, and phosphorus from highly concentrated waste water in that a waste water having the contaminants such as organic substances, nitrogen, and phosphorus contained in the highly concentrated organic waste waters such as a food waste water or a livestock sludge waste water and so on is introduced into a first line mixer together with a neutralizer dissolved in a neutralizer dissolving tank at an early stage so as to induce a neutralization status for easily condensing the contaminants such as organic substances, nitrogen, and phosphorus; the highly concentrated organic waste waters can be easily condensed by mixing the contaminants such as organic substances, nitrogen, and phosphorus of the waste water or the liquid material with agglomerates by a second through a fifth line mixer after the mixing of the neutralizer; the waste water or the liquid material transferred in a status that the contaminants is condensed is introduced into first and second gravity concentrators so as to float the condensed sludge having organic substances, nitrogen, and phosphorus and the condensed sludge is introduced into first and second vertical pneumatic dehydrators so as to dehydrate it, thereby effectively removing the dehydrated sludge; the fine agglomerates, which are not condensed, via first and second vertical pneumatic dehydrators is floated through an air foam of first and second first pressurizing floatation tanks to be removed, thereby improving the accuracy and efficiency of the sludge dehydration operation more and more; the organic substances, nitrogen, and phosphorus of the waste water are continuously and easily condensed by means of second through fifth line mixers, thereby effectively removing the floating material of the waste water, nitrogen, and phosphorus and simplifying the removing process; and the installation area of the continuous removal device of the highly concentrated organic substances, nitrogen and phosphorus can be minimized and the treating processing efficiency thereof can be maximized.

BACKGROUND ART

In general, since it is very hard to basically treat a food waste water or a livestock sludge waste water and so on, which are widely known as a highly concentrated organic waste water, by means of the existed water treatment method, most of them are simply treated through an ocean dumping. However, since the ocean dumping is strictly prohibited in Korea from 2013 according to the London Convention, it should be treated in the land.

In the other way for treating the above highly concentrated organic waste water, the food waste water or the livestock sludge waste water and so on are diluted in conjunction with large sewage treatment plants. However, since it has a great difficulty in sewage treatment on account of the increase of the pollution load of the sewage treatment plant, the food waste water or the livestock sludge waste water cannot be continuously treated. Also, since it takes a lot of costs and is economically infeasible, there is no effectiveness In particular, since the highly concentrated organic waste water contains lots of the polluted materials such as organic substances, nitrogen, and phosphorus, the organic substances, nitrogen, and phosphorus are removed through the removal process of organic material and the nitrification process for a long period. To achieve this, it has developed a method for removing the nitrogen and the phosphorus by using a centrifugal separator or a belt press machine. However, it is actually difficult to effectively remove the nitrogen and phosphorus.

On the other hand, in recent years, an anaerobic digestion process for producing a biogas through an anaerobic digestion for the waste water having high organic content has been known. However, since this process also has high pollution load of the highly concentrated organic waste water, it causes many failures in the anaerobic digestion. Even if the anaerobic digestion for a long time has been finished, since the anaerobic digestion waste water contains lots of the nitrogen and the phosphorus, it causes many failures in follow-up process, so that the economic feasibility is deteriorated considerably and it is impossible to stabilize the water quality.

DISCLOSURE

Technical Problem

Accordingly, the present invention has been made to solve the above-mentioned problems occurring in the prior art, and a object of the present invention is to provide a method and apparatus for removing organic substances, nitrogen, and phosphorus from highly concentrated waste water in that a waste water having the contaminants such as organic substances, nitrogen, and phosphorus contained in the highly concentrated organic waste waters such as a food waste water or a livestock sludge waste water and so on is introduced into a first line mixer together with a neutralizer dissolved in a neutralizer dissolving tank at an early stage so as to induce a neutralization status for easily condensing the contaminants such as organic substances, nitrogen and phosphorus; the highly concentrated organic waste waters can be easily condensed by mixing the contaminants such as organic substances, nitrogen, and phosphorus of the waste water or the liquid material with agglomerates by a second through a fifth line mixer after the mixing of the neutralizer; the waste water or the liquid material transferred in a status that the contaminants is condensed is introduced into first and second gravity concentrators so as to float the condensed sludge having organic substances, nitrogen, and phosphorus and the condensed sludge is introduced into first and second vertical pneumatic dehydrators so as to dehydrate it, thereby effectively removing the dehydrated sludge; and the fine agglomerates, which are not condensed, via first and second vertical pneumatic dehydrators is floated through an air foam of first and second first pressurizing floatation tanks to be removed, thereby improving the accuracy and efficiency of the sludge dehydration operation more and more; the organic substances, nitrogen, and phosphorus of the waste water are continuously and easily condensed by means of second through fifth line mixers, thereby effectively removing the floating material of the waste water, nitrogen, and phosphorus and simplifying the removing process.

Also, the present invention is to provide a method and apparatus for removing organic substances, nitrogen, and phosphorus from highly concentrated waste water in that the installation area of the continuous removal device of the highly concentrated organic substances, nitrogen, and phosphorus can be minimized and the treating processing efficiency can be maximized.

Technical Solution

In order to accomplish these objects, there is provided a method for removing organic substances, nitrogen, and phosphorus from highly concentrated waste water comprising steps of: stirring the highly concentrated organic waste water with the highly concentrated organic substances, nitrogen, and phosphorus introduced into a waste water reservoir through a stirrer; transferring the waste water of the waste water reservoir to a first line mixer via a waste water transfer tube by means of a transfer pump and dissolving a neutralizer in a neutralizer dissolving tank, which is formed at one side of an upper portion of the waste water reservoir together with a clear water through the stirrer, which is connected to the motor; introducing the neutralizer dissolved in the neutralizer dissolving tank into the first line mixer so as to perform a mixing action of the highly concentrated organic waste water with highly concentrated organic substances, nitrogen, and phosphorus and the neutralizer; transferring the organic waste water mixed with the neutralizer via the first line mixer to a waste water reservoir to perform mixing and neutralizing actions thereof in a neutralization tank having a stirrer therein; transferring the organic waste water passing through the neutralization action in the neutralization tank to a second line mixer and stirring a coagulant in a coagulant stirring tank, which is formed at one side of the neutralizer dissolving tank, in a multi-stage together with the clear water through a stirrer, which is connected to a motor; transferring the coagulant, which is stirred in a multi-stage in the coagulant stirring tank to a second line mixer so as to perform a mixing action of the highly concentrated organic waste water mixed with the neutralizer and the coagulant and a condensing action of the organic substances, nitrogen, and phosphorus of waste water; transferring the highly concentrated organic waste water mixed with the coagulant through the second line mixer into a first gravity concentrator so as to transfer a condensed sludge to an upper portion thereof and discharge a liquid material into an interior of the reservoir by filtering a foreign substance through a filter having spaces of 0.05~1.5 mm and transferring a condensed sludge transferred to an upper portion thereof to a first vertical pneumatic dehydrator formed at one side thereof via a filter screen, which is formed at one side of the upper portion of the gravity concentrator; dehydrating the liquid material from the waste water transferred to the first vertical pneumatic dehydrator through a vertical dewatering screw provided inside the first vertical pneumatic dehydrator to be discharged into the reservoir, transferring the dehydrated sludge to a pressurizing dehydrator having a belt press therein, and pressurizing and dehydrating it to be discharged as a sludge in that a moisture is removed; transferring the liquid material, which is introduced into the reservoir, to a third line mixer through a quantitative transfer pump so as to condense a fine floating matter, which is existed inside the liquid material, passing the liquid material condensed completely through the third line mixer through a first pressurizing floatation tank for supplying the micro air through a nozzle so as to return the condensed and floated scum to the waste water reservoir via a scum reservoir, and introducing the liquid material, in that agglomerates are removed, into a digester chamber by a predetermined amount via the reservoir through a quantitative transfer pump; storing the liquid material, which is introduced into the digester chamber, into the digester chamber for 1-7 days so as to discharge a biogas and perform a digestion reaction thorough an anaerobic microbe, which is existed inside the digester chamber and discharging the liquid material digested completely in the digester chamber to a reservoir through a quantitative transfer pump; transferring the liquid material, which is stored in the reservoir to a four line mixer so as to stir and mix it with the coagulant supplied from the coagulant stirring tank, transferring the liquid material mixed with the coagulant into a second gravity concentrator so as to transfer the condensed sludge to the upper portion thereof and discharge the liquid material into the interior of a reservoir, and transferring the condensed sludge transferred to the upper portion thereof to a second vertical pneumatic dehydrator formed at one side thereof via a filter screen 91, which is formed at one side of the upper portion of the second gravity concentrator; dehydrating the liquid material of the condensed sludge transferred to the second vertical pneumatic dehydrator through a vertical dewatering screw provided inside the second vertical pneumatic dehydrator to be discharged into a fifth line mixer, transferring the condensed sludge to the pressurizing dehydrator having the belt press therein, and pressurizing and dehydrating it to be again discharged as a sludge in that the moisture is removed; and introducing the liquid material, which is introduced into the reservoir into a second pressurizing floatation tank for supplying the micro air through a nozzle via a fifth line mixer, introducing the scum condensed and floated in the second pressurizing floatation tank to the waste water reservoir via the scum reservoir, and discharging the liquid material, in that the agglomerates are removed, to a waste water-disposal plant via a discharge unit as the reservoir.

Also, the neutralizer introduced into the neutralizer dissolving tank is caustic soda (NaOH) and calcium hydroxide (slaked lime).

Also, the coagulant introduced and condensed into coagulant stirring tank is polyacrylamide.

In order to accomplish these objects, there is provided an apparatus for removing organic substances, nitrogen, and phosphorus from the highly concentrated organic waste water comprising: a waste water reservoir for introducing the highly concentrated organic waste water with highly concentrated organic substances, nitrogen, and phosphorus therein and stirring it through a stirrer; a first line mixer connected to and formed at a lower portion of the waste water reservoir via a transfer pump and a waste water transfer tube; a neutralizer dissolving tank formed at one side of an upper portion of the waste water reservoir, connected to the first line mixer, and having a stirrer therein so as to introduce a neutralizer therein to be dissolved; a neutralization tank connected to and formed at one side of the first line mixer via the waste water transfer tube and having a stirrer therein; a first gravity concentrator connected to and formed at one side of the neutralization tank via a second line mixer; a coagulant stirring tank for introducing a coagulant therein formed at one side of the neutralizer dissolving tank in a multi-stage and connected to the second line mixer; a first vertical pneumatic dehydrator connected to and formed at one side of an upper portion of the first gravity concentrator via a filter screen, which is formed on the first gravity concentrator, and having a vertical dewatering screw vertically formed therein; a reservoir for storing a dehydrated liquid material therein connected to and formed at a lower portion of the first vertical pneumatic dehydrator; a pressurizing dehydrator connected to and formed at one side of the first vertical pneumatic dehydrator and having a belt press therein so as to press and dehydrate a sludge to be discharged; a first pressurizing floatation tank for supplying a micro air connected to and formed at one side of the reservoir via a third line mixer; a digester chamber connected to and formed at a lower portion of the first pressurizing floatation tank via a reservoir for storing the liquid material, in that agglomerates are removed; a reservoir for storing the liquid material digested by means of an anaerobic microbe for a certain period of time formed at one side of the digester chamber; a second gravity concentrator for transferring a condensed sludge to an upper portion thereof and discharging the liquid material into the interior of a reservoir connected to and formed at one side of the reservoir via a fourth line mixer; a second vertical pneumatic dehydrator connected to and formed at one side of the second gravity concentrator via a filter screen, which is formed on one side of the upper portion of the second gravity concentrator, and having a vertical dewatering screw vertically formed therein; the reservoir for storing the dehydrated water connected to and formed at a lower portion of the second vertical pneumatic dehydrator; the pressurizing dehydrator for discharging as a sludge by pressuring and dehydrating the sludge through the pressure roller, which is formed therein, connected to and formed at one side of the second vertical pneumatic dehydrator; a second pressurizing floatation tank for supplying a micro air so as to float a scum connected to and formed at one side of the liquid material reservoir via a fifth line mixer; a scum reservoir for storing a scum condensed and floated in the second pressurizing floatation tank connected to and formed at one side of the second pressurizing floatation tank; and a discharge unit for discharging the liquid material to a waste water-disposal plant connected to and formed at a lower portion of the second pressurizing floatation tank.

Advantageous Effects

According to the method and apparatus for removing organic substances, nitrogen, and phosphorus from highly concentrated waste water, the waste water having the contaminants such as organic substances, nitrogen, and phosphorus contained in the highly concentrated organic waste waters such as a food waste water or a livestock sludge waste water and so on is introduced into the first line mixer together with the neutralizer dissolved in the neutralizer dissolving tank at an early stage so as to induce the neutralization status for easily condensing the contaminants such as organic substances, nitrogen, and phosphorus; the highly concentrated organic waste waters can be easily condensed by mixing the contaminants such as organic substances, nitrogen, and phosphorus of the waste water or the liquid material with agglomerates by the second through the fifth line mixers after the mixing of the neutralizer; the waste water or the liquid material transferred in a status that the contaminants is condensed is introduced into the first and second gravity concentrators so as to float the condensed sludge having the organic substances, nitrogen, and phosphorus and the condensed sludge is introduced into first and second vertical pneumatic dehydrators so as to dehydrate it, thereby effectively removing the dehydrated sludge; the fine agglomerates, which are not condensed, via the first and second vertical pneumatic dehydrators is floated through the air foam of the first and second first pressurizing floatation tanks to be removed, thereby improving the accuracy and efficiency of the sludge dehydration operation more and more; the organic substances, nitrogen, and phosphorus of the waste water are continuously and easily condensed by means of the second through the fifth line mixers, thereby effectively removing the floating material of the waste water, nitrogen, and phosphorus and simplifying the removing process; and the installation area of the continuous removal device of the highly concentrated organic substances, nitrogen and phosphorus can be minimized and the treating processing efficiency can be maximized.

Although a preferred embodiment of the present invention has been described for illustrative purposes, those skilled in the art will appreciate that various modifications, additions and substitutions are possible, without departing from the scope and spirit of the invention as disclosed in the accompanying claims.

BRIEF DESCRIPTION OF THE DRAWINGS

The above and other objects, features and advantages of the present invention will be more apparent from the following detailed description taken in conjunction with the accompanying drawings, in which.

DESCRIPTIONS ON REFERENCE NUMBERS FOR THE MAJOR COMPONENTS IN THE DRAWINGS

Figure 1:
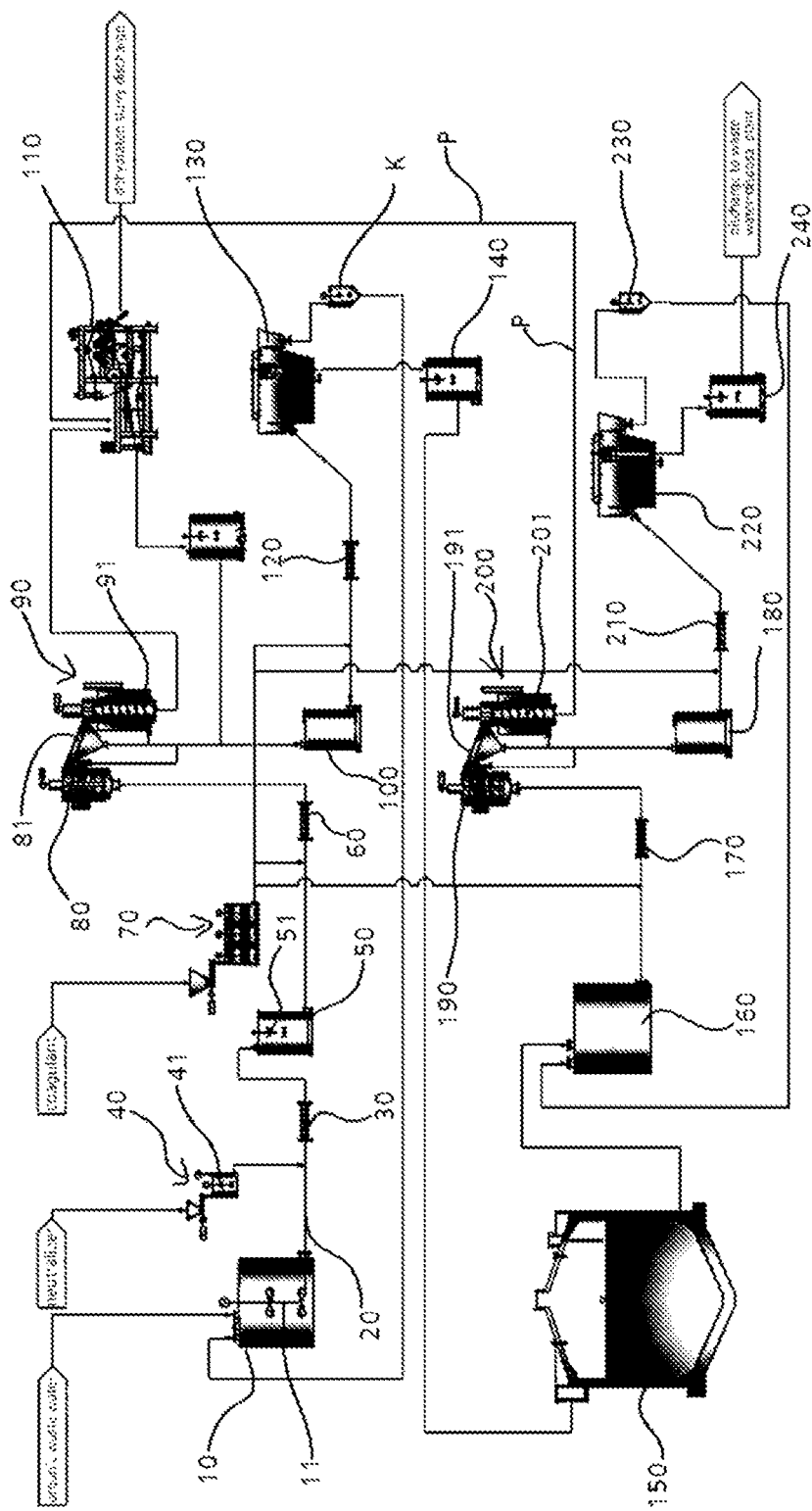
FIG. 1 is a schematic configuration diagram illustrating an apparatus for removing organic substances, nitrogen, and phosphorus from a highly concentrated organic waste water according to the invention.

10: Waste water reservoir
11: Stirrer
20: Transfer tube
30: First line mixer
40: Dissolving tank
41: Stirrer
50: Neutralization tank
51: Stirrer
60: Second line mixer
70: Coagulant stirring tank
80: First gravity concentrator
81: Filter screen
90: First vertical pneumatic dehydrator
91: Vertical dewatering screw
100: Reservoir
110: Pressurizing dehydrator
120: Third line mixer
130: First pressurizing floatation tank
140: Reservoir
150: Digester chamber
160: Reservoir
170: Fourth line mixer
180: Reservoir
190: Second gravity concentrator
191: Filter screen
200: Second vertical pneumatic dehydrator
201: Vertical dewatering screw
210: Fifth line mixer
220: Second pressurizing floatation tank 230: Scum reservoir
240: Discharge unit
P: Transfer pipe

BEST MODE

Mode for Invention

Hereinafter, an exemplary embodiment of the present invention will be described in detail with reference to the accompanying drawings. The known functions and configurations will be omitted for the description that may unnecessarily obscure the gist of the invention in detail.

Figure 2:
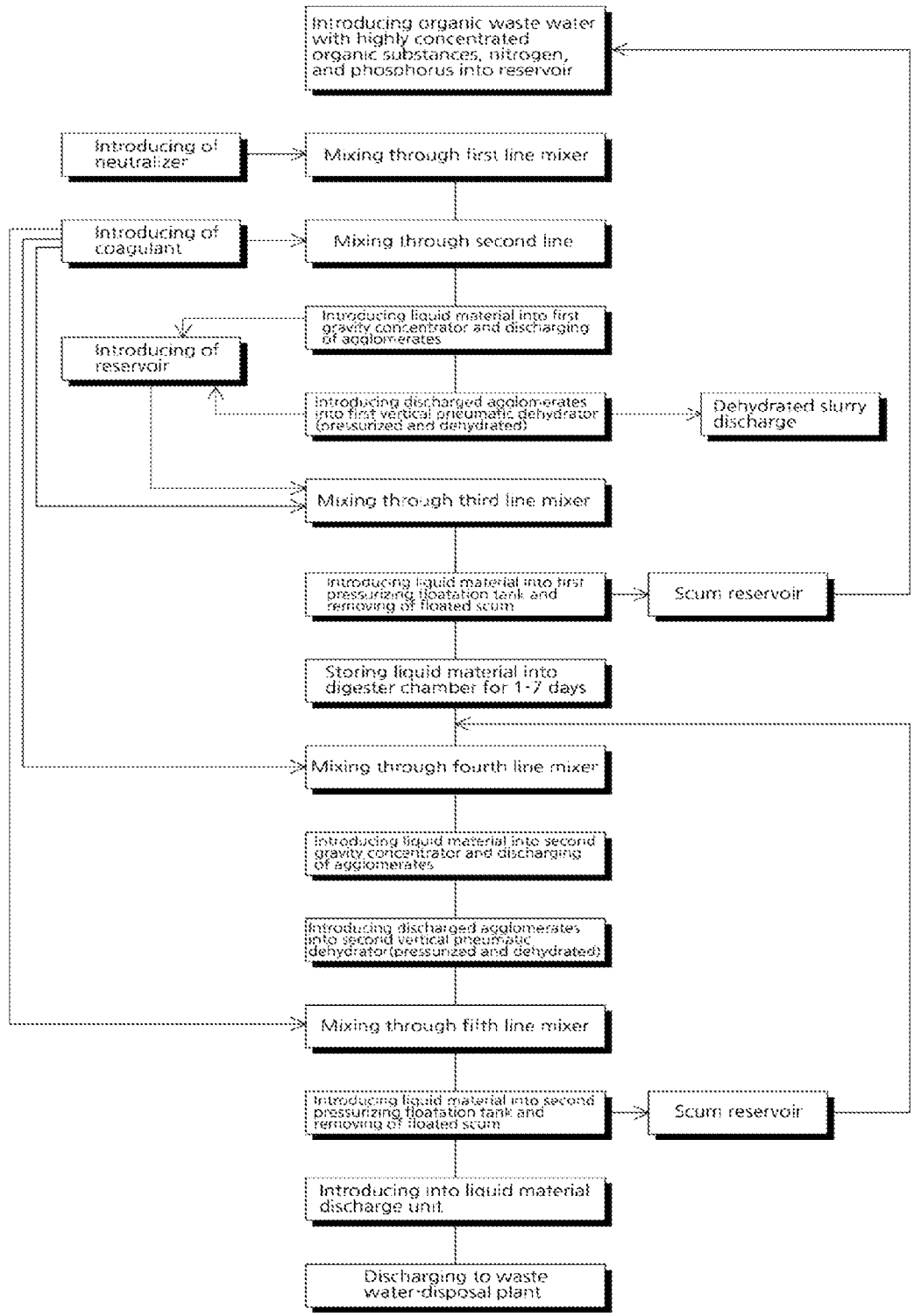
FIG. 2 is a flow chart illustrating a method for removing organic substances, nitrogen, and phosphorus from a highly concentrated organic waste water according to the invention.

FIG. 1 is a schematic configuration diagram illustrating an apparatus for removing organic substances, nitrogen, and phosphorus from a highly concentrated organic waste water according to the invention and FIG. 2 is a flow chart illustrating a method for removing organic substances, nitrogen, and phosphorus from a highly concentrated organic waste water according to the invention. The apparatus for removing organic substances, nitrogen, and phosphorus from the highly concentrated organic waste water according to the invention includes a waste water reservoir 10 for introducing the highly concentrated organic waste water with highly concentrated organic substances, nitrogen, and phosphorus therein and stirring it through a stirrer 11; a first line mixer 30 connected to and formed at a lower portion of the waste water reservoir 10 via a transfer pump (not shown) and a waste water transfer tube 20; and a neutralizer dissolving tank 40 formed at one side of an upper portion of the waste water reservoir 10 and having a stirrer 41 therein so as to introduce a neutralizer therein to be dissolved.

Also, the apparatus for removing organic substances, nitrogen, and phosphorus from the highly concentrated organic waste water according to the invention further includes a neutralization tank 50 connected to and formed at one side of the first line mixer 30 via the waste water transfer tube 20 and having a stirrer 51 therein; a first gravity concentrator 80 connected to and formed at one side of the neutralization tank 50 via a second line mixer 60; a coagulant stirring tank 70 for introducing a coagulant therein formed at one side of the neutralizer dissolving tank 40 in a multi-stage and connected to the second line mixer 60; a first vertical pneumatic dehydrator 90 connected to and formed at one side of an upper portion of the first gravity concentrator 80 via a filter screen 81, which is formed on the first gravity concentrator 80, and having a vertical dewatering screw 91 vertically formed therein; a reservoir 100 for storing a dehydrated liquid material therein connected to and formed at a lower portion of the first vertical pneumatic dehydrator 90; a pressurizing dehydrator 110 connected to and formed at one side of the first vertical pneumatic dehydrator 90 and having a belt press therein so as to press and dehydrate a sludge to be discharged; a first pressurizing floatation tank 130 for supplying a micro air connected to and formed at one side of the reservoir 100 via a third line mixer 120; and a digester chamber 150 connected to and formed at a lower portion of the first pressurizing floatation tank 130 via a reservoir 140 for storing the liquid material, in that agglomerates are removed.

Also, the apparatus for removing organic substances, nitrogen, and phosphorus from the highly concentrated organic waste water according to the invention further includes a reservoir 160 for storing the liquid material digested by means of an anaerobic microbe formed at one side of the digester chamber 150; a second gravity concentrator 190 for transferring a condensed sludge to the upper portion thereof and discharging the liquid material into the interior of a reservoir 180 connected to and formed at one side of the reservoir 160 via a fourth line mixer 170; a second vertical pneumatic dehydrator 200 connected to and formed at one side of the second gravity concentrator 190 via a filter screen 191, which is formed on one side of the upper portion of the second gravity concentrator 190, and having a vertical dewatering screw 201 vertically formed therein; the reservoir 180 for storing the dehydrated water connected to and formed at the lower portion of the second vertical pneumatic dehydrator 200; the pressurizing dehydrator 110 for discharging as a sludge by pressuring and dehydrating the sludge through the pressure roller, which is formed therein, connected to and formed at one side of the second vertical pneumatic dehydrator 200; and a second pressurizing floatation tank 220 for supplying a micro air so as to float a scum connected to and formed at one side of the liquid material reservoir 180 via a fifth line mixer 210.

At this time, the apparatus for removing organic substances, nitrogen, and phosphorus from the highly concentrated organic waste water according to the invention further includes a scum reservoir 230 for storing the scum condensed and floated in the second pressurizing floatation tank 220 and a discharge unit 240 for discharging the liquid material to the waste water-disposal plant connected to and formed at the lower portion of the second pressurizing floatation tank 220.

The embodiment of the present invention made in such a configuration will be described in detail as follows.

As shown in FIG. 1 and FIG. 2, the highly concentrated organic waste water with highly concentrated organic substances, nitrogen, and phosphorus such as a food waste or a livestock waste etc. introduced into the waste water reservoir 10 is stirred through the stirrer 11 and then, the highly concentrated organic waste water of the waste water reservoir 10 is transferred to the first line mixer 30 by an appropriate amount via the waste water transfer tube 20 by means of the transfer pump (not shown). At this time, the neutralizer such as caustic soda (NaOH) and calcium hydroxide (slaked lime) is dissolved in the neutralizer dissolving tank 40, which is formed at one side of the upper portion of the waste water reservoir 10, together with the clear water through the stirrer 41, which is connected to the motor, by means of the stirring action and then, the neutralizer dissolved in the neutralizer dissolving tank 40 is introduced into the first line mixer 30 so as to perform a mixing action of the highly concentrated organic waste water with highly concentrated organic substances, nitrogen, and phosphorus and the neutralizer, thereby easily condense the highly concentrated organic waste water with highly concentrated organic substances, nitrogen, and phosphorus.

The organic waste water mixed with the neutralizer via the first line mixer 30 is transferred to the neutralization tank 50 to perform the mixing and neutralizing action thereof through the stirrer 51, which is installed in the neutralization tank 50 and the organic waste water passing through the neutralization action in the neutralization tank 50 is transferred to the second line mixer 60. At this time, the coagulant is sequentially dissolved in the coagulant stirring tank 70, which is formed at one side of the neutralizer dissolving tank 40 in a multi-stage, together with the clear water through the stirrer (no reference numeral), which is connected to the motor. At this time, the coagulant, which is completely dissolved and supplied through the multistage coagulant stirring tank 70, may be polyacrylamide and the like, which is a polymer compound.

As described above, the coagulant, which is stirred in a multi-stage and completely dissolved in the coagulant stirring tank 70, is transferred to the second line mixer 60 so as to perform a mixing action of the highly concentrated organic waste water mixed with the neutralizer and the coagulant and a condensing action of the organic substances, nitrogen, and phosphorus of waste water.

Subsequently, the highly concentrated organic waste water mixed with the coagulant through the second line mixer 60 is transferred into the first gravity concentrator 80 so as to transfer the condensed sludge to the upper portion thereof and discharge the liquid material into the interior of the reservoir 100 by filtering the foreign substance through a filter (not shown) having spaces of 0.05~1.5 mm. At this time, the moisture of the condensed sludge transferred to the upper portion thereof is removed through the filter screen 81, which is formed at one side of the upper portion of the first gravity concentrator 80 and then, the condensed sludge is transferred to the first vertical pneumatic dehydrator 90 formed at one side thereof and the liquid material is again dehydrated through the vertical dewatering screw 91 provided inside the first vertical pneumatic dehydrator 90 to be discharged into the reservoir 100. Here, the dried sludge completely dehydrated in the first vertical pneumatic dehydrator 90 is transferred to the pressurizing dehydrator 110 having the belt press therein and then again pressurized and dehydrated to be discharged as a sludge in that the moisture is substantially removed, thereby improving the accuracy and efficiency of the sludge dehydration operation more and more.

On the other hand, the liquid material, which is introduced into the reservoir 100, is transferred to the third line mixer 120 by an appropriate amount through a quantitative transfer pump (not shown) so as to condense the fine floating matter, which is existed inside the liquid material, through the coagulant introduced from the coagulant stirring tank 70. At this time, the liquid material mixed and condensed completely through the third line mixer 120 is passed through the first pressurizing floatation tank 130 for supplying the micro air through a nozzle so as to return the condensed and floated scum to the waste water reservoir 10 via the scum reservoir K. Then, the liquid material, in that the agglomerates are removed, is introduced into the digester chamber 150 by a predetermined amount via the reservoir 140 through the quantitative transfer pump.

The liquid material, which is introduced into the digester chamber 150, is stored in into the digester chamber 150 for 1-7 days so as to discharge the biogas and perform the digestion reaction thorough the anaerobic microbe, which is existed inside the digester chamber 150. At this time, the liquid material digested completely in the digester chamber 150 is transferred to the reservoir 160 by an appropriate amount through a quantitative transfer pump (not shown) to be stored therein.

The liquid material, which is stored in the reservoir 160, is transferred to the four line mixer 170 so as to stir and mix it with the coagulant supplied from the coagulant stirring tank 70 and then, The liquid material mixed with the coagulant is transferred into the second gravity concentrator 190 so as to transfer the condensed sludge to the upper portion thereof and discharge the liquid material into the interior of the reservoir 180. At this time, the moisture of the condensed sludge transferred to the upper portion thereof is removed through the filter screen 191, which is formed at one side of the upper portion of the second gravity concentrator 190 and then, the condensed sludge is transferred to the second vertical pneumatic dehydrator 200 formed at one side thereof and the liquid material is dehydrated through the vertical dewatering screw 201 provided inside the second vertical pneumatic dehydrator 200 to be discharged into the fifth line mixer 210. Here, the condensed sludge dehydrated through the vertical dewatering screw 201 is transferred to the pressurizing dehydrator 110 having the belt press therein and then again pressurized and dehydrated to be discharged as a sludge in that the moisture is removed.

On the other hand, the liquid material, which is introduced into the reservoir 180, is again stirred and mixed with the coagulant supplied from the coagulant stirring tank 70 through the fifth line mixer 210 and then, the liquid material mixed and condensed completely through the fifth line mixer 210 is introduced into the second pressurizing floatation tank 220 for supplying the micro air through a nozzle. At this time, the scum condensed and floated in the second pressurizing floatation tank 220 is introduced to the waste water reservoir 160 via the scum reservoir 230. Then, the liquid material, in that the agglomerates are removed, is discharged to the waste water-disposal plant via the discharge unit 240 as the reservoir.

The organic substances, nitrogen, and phosphorus of the waste water are continuously and easily condensed by means of the second through the fifth line mixers 60~210, thereby effectively removing the floating material of the waste water, nitrogen, and phosphorus and simplifying the removing process; and the installation area of the continuous removal device of the highly concentrated organic substances, nitrogen, and phosphorus can be minimized and the treating processing efficiency can be maximized.

INDUSTRIAL APPLICABILITY

The present invention may be applied to the treatment of a variety of the highly concentrated organic waste water containing a waste water such as the food waste or the livestock waste and so on.

What is claimed is:

1. A method for removing organic substances, nitrogen, and phosphorus from organic waste water, the method comprising steps of:

stirring the organic waste water including organic substances, nitrogen, and phosphorus introduced into a waste water reservoir through a stirrer;

transferring the organic waste water of the waste water reservoir to a first line mixer via a waste water transfer tube by means of a transfer pump and dissolving a neutralizer in a neutralizer dissolving tank, which is formed at one side of an upper portion of the waste water reservoir, together with a clear water through the stirrer, which is connected to a motor;

introducing the neutralizer dissolved in the neutralizer dissolving tank into the first line mixer and mixing the neutralizer with the organic waste water;

transferring the organic waste water mixed with the neutralizer via the first line mixer to the waste water reservoir to perform mixing and neutralizing actions thereof in a neutralization tank having a stirrer therein;

transferring the organic waste water, which has passed through the neutralizing action in the neutralization tank, to a second line mixer and stirring a coagulant in a coagulant stirring tank, which is formed at one side of the neutralizer dissolving tank, in a multi-stage together with the clear water through a stirrer, which is connected to a motor;

transferring the coagulant, which is stirred in the multi-stage in the coagulant stirring tank, to the second line mixer so as to perform a mixing action of the organic waste water mixed with the neutralizer and the coagulant and a condensing action of the organic substances, nitrogen, and phosphorus of the organic waste water;

transferring the organic waste water mixed with the coagulant through the second line mixer into a first gravity concentrator so as to transfer a condensed sludge to an upper portion thereof and discharge a liquid material into an interior of a first reservoir by filtering a foreign substance through a filter having spaces of 0.05 to 1.5 mm and transferring the condensed sludge to a first vertical pneumatic dehydrator formed at one side thereof via a filter screen, which is formed at one side of the upper portion of the gravity concentrator;

dehydrating liquid material from the condensed sludge, which is transferred to the first vertical pneumatic dehydrator, through a vertical dewatering screw provided inside the first vertical pneumatic dehydrator to be discharged into the first reservoir, transferring the dehydrated condensed sludge to a pressurizing dehydrator having a belt press therein, and pressurizing and dehydrating it to be discharged as a sludge in which moisture is removed;

transferring the liquid material, which is introduced into the first reservoir, to a third line mixer through a quantitative transfer pump so as to condense a fine floating matter inside the liquid material, passing the liquid material, which is condensed completely by the third line mixer, through a first pressurizing floatation tank which supplies micro air through a nozzle, so as to return condensed and floated scum to the waste water reservoir via a scum reservoir, and introducing the liquid material, from which agglomerates are removed, into a digester chamber by a predetermined amount via a second reservoir through a quantitative transfer pump;

storing the liquid material in the digester chamber for 1 to 7 days so as to discharge a biogas and perform a digestion reaction through an anaerobic microbe inside the digester chamber and discharging the liquid material digested completely in the digester chamber to a third reservoir through a quantitative transfer pump;

transferring the liquid material, which is stored in the third reservoir, to a fourth line mixer so as to stir and mix it with the coagulant supplied from the coagulant stirring tank, transferring the liquid material mixed with the coagulant into a second gravity concentrator so as to transfer the condensed sludge to an upper portion thereof and discharge the liquid material into an interior of a fourth reservoir, and transferring the condensed sludge transferred to the upper portion thereof to a second vertical pneumatic dehydrator formed at one side thereof via a filter screen, which is formed at one side of the upper portion of the second gravity concentrator;

dehydrating liquid material from the condensed sludge, which is transferred to the second vertical pneumatic dehydrator, through a vertical dewatering screw provided inside the second vertical pneumatic dehydrator to be discharged into a fifth line mixer, transferring the condensed sludge to the pressurizing dehydrator having the belt press therein, and pressurizing and dehydrating it to be again discharged as a sludge in which moisture is removed; and introducing the liquid material, which is introduced into the fourth reservoir, into a second pressurizing floatation tank which supplies micro air through a nozzle via a fifth line mixer, introducing scum condensed and floated in the second pressurizing floatation tank to the waste water reservoir via a scum reservoir, and discharging the liquid material, from which agglomerates are removed, to a waste water-disposal plant via a discharge unit.

2. The method of claim 1, wherein the neutralizer introduced into the neutralizer dissolving tank is caustic soda (NaOH) and calcium hydroxide (slaked lime).

3. The method of claim 1, wherein the coagulant introduced and condensed into coagulant stirring tank is polyacrylamide.

4. An apparatus for removing organic substances, nitrogen, and phosphorus from organic waste water, the apparatus comprising:
a waste water reservoir for introducing the organic waste water with organic substances, nitrogen, and phosphorus therein and stirring it through a stirrer;
a first line mixer connected to and formed at a lower portion of the waste water reservoir via a transfer pump and a waste water transfer tube;
a neutralizer dissolving tank formed at one side of an upper portion of the waste water reservoir, connected to the first line mixer, and having a stirrer therein so as to introduce a neutralizer therein to be dissolved;
a neutralization tank connected to and formed at one side of the first line mixer via the waste water transfer tube and having a stirrer therein;
a first gravity concentrator connected to and formed at one side of the neutralization tank via a second line mixer;
a coagulant stirring tank for introducing a coagulant therein formed at one side of the neutralizer dissolving tank in a multi-stage and connected to the second line mixer;
a first vertical pneumatic dehydrator connected to and formed at one side of an upper portion of the first gravity concentrator via a filter screen, which is formed on the first gravity concentrator, and having a vertical dewatering screw vertically formed therein;
a first reservoir for storing a dehydrated liquid material therein connected to and formed at a lower portion of the first vertical pneumatic dehydrator;
a pressurizing dehydrator connected to and formed at one side of the first vertical pneumatic dehydrator and having a belt press therein so as to press and dehydrate a sludge to be discharged;
a first pressurizing floatation tank for supplying a micro air connected to and formed at one side of the first reservoir via a third line mixer;
a digester chamber connected to and formed at a lower portion of the first pressurizing floatation tank via a second reservoir for storing the liquid material, in that agglomerates are removed;
a third reservoir for storing the liquid material digested by means of an anaerobic microbe for a period of time formed at one side of the digester chamber;
a second gravity concentrator for transferring a condensed sludge from the third reservoir via a fourth line mixer to an upper portion thereof and discharging the liquid material into an interior of a fourth reservoir;
a second vertical pneumatic dehydrator connected to and formed at one side of the second gravity concentrator via a filter screen, which is formed on one side of the upper portion of the second gravity concentrator, and having a vertical dewatering screw vertically formed therein, the fourth reservoir being connected to and formed at a lower portion of the second vertical pneumatic dehydrator, the pressurizing dehydrator being connected to and formed at one side of the second vertical pneumatic dehydrator, a pressure roller being formed in the second vertical pneumatic dehydrator;

a second pressurizing floatation tank for supplying a micro air so as to float a scum, the second pressurizing floatation tank being connected to and formed at one side of the fourth reservoir via a fifth line mixer;

a scum reservoir for storing the scum condensed and floated in the second pressurizing floatation tank, the scum reservoir being connected to and formed at one side of the second pressurizing floatation tank; and a discharge unit for discharging the liquid material to a waste water-disposal plant, the discharge unit being connected to and formed at a lower portion of the second pressurizing floatation tank.

* * * * *